Sept. 6, 1966  
M. A. HALL  
3,271,064  
METHOD AND APPARATUS FOR MAKING INDEFINITE  
LENGTH FLEXIBLE CONDUIT  
Filed Dec. 5, 1962  
4 Sheets-Sheet 1
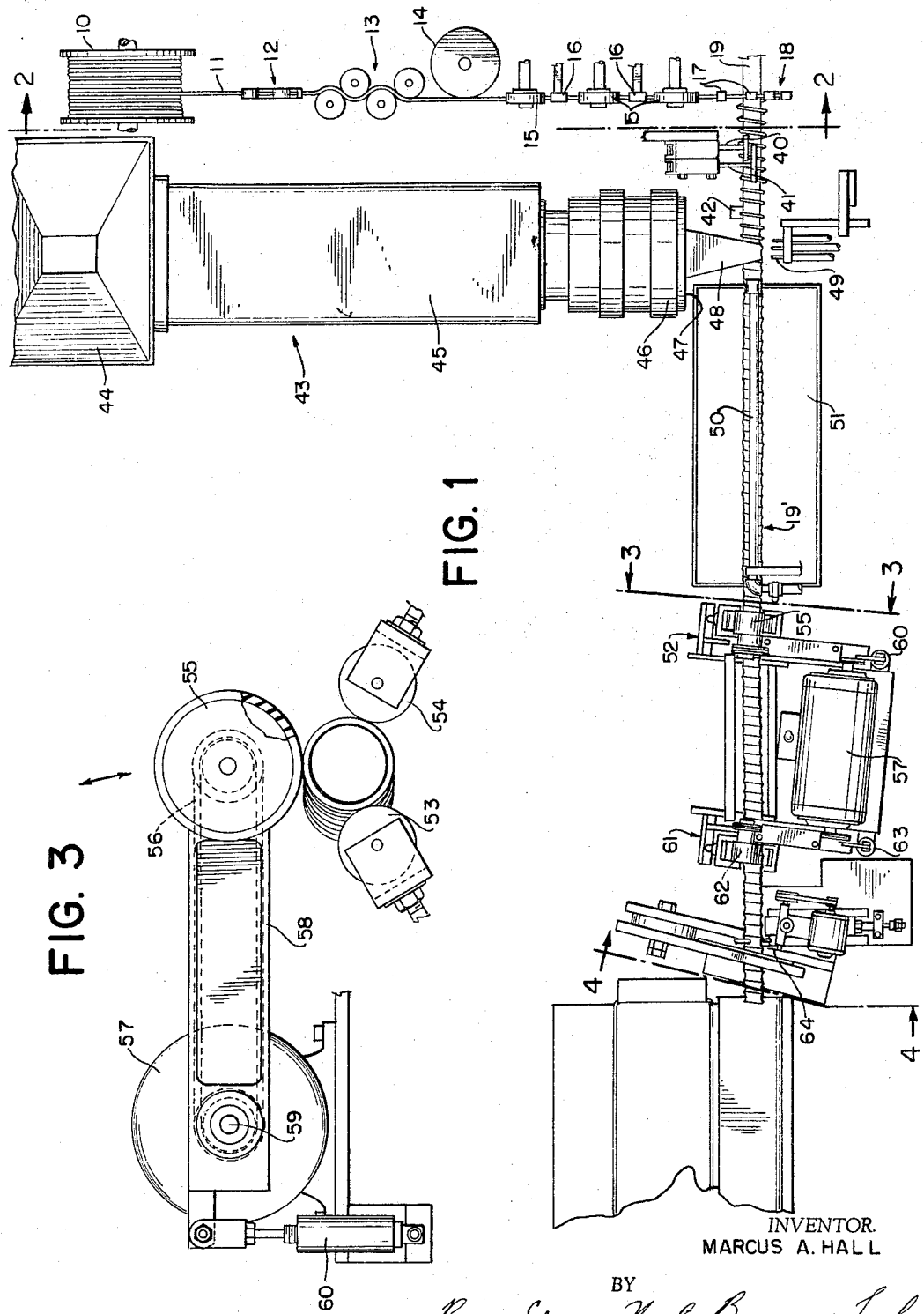
INVENTOR.  
MARCUS A. HALL  
BY  
*Pennie, Edmonds, Morton, Barrows & Taylor*  
ATTORNEYS Sept. 6, 1966    M. A. HALL    3,271,064
METHOD AND APPARATUS FOR MAKING INDEFINITE
LENGTH FLEXIBLE CONDUIT
Filed Dec. 5, 1962    4 Sheets-Sheet 2
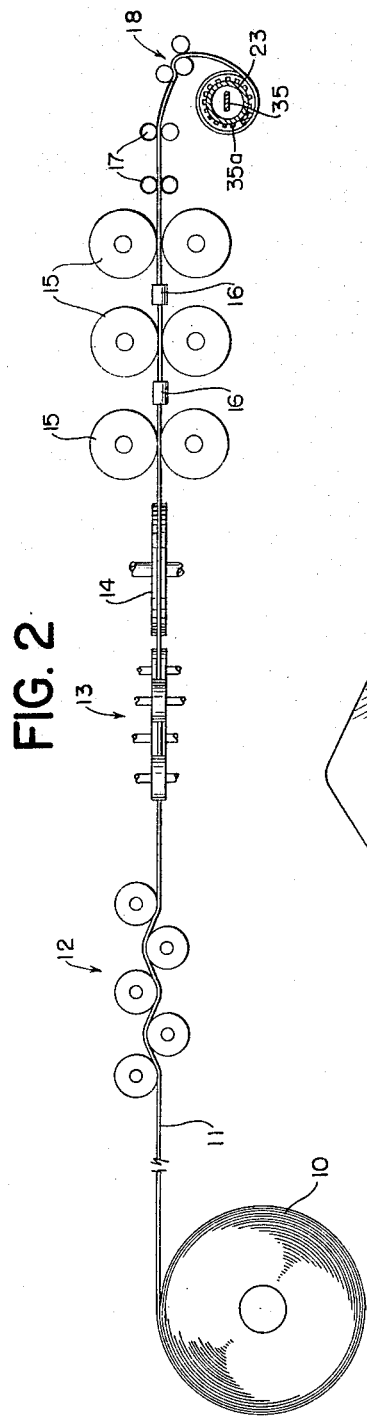
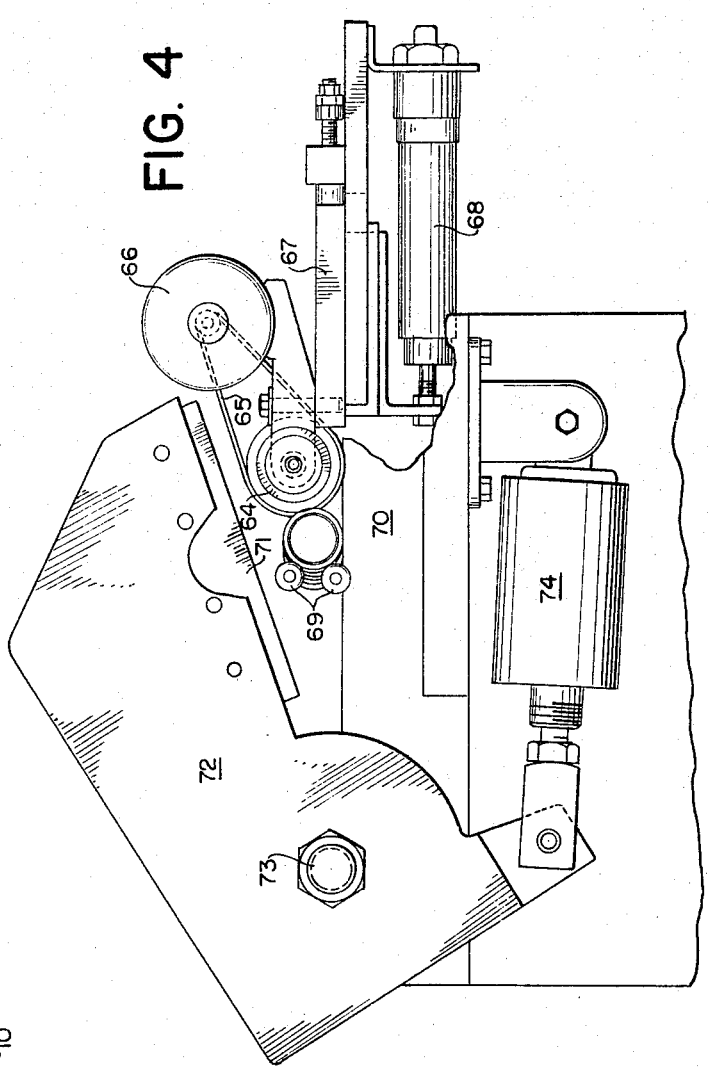
INVENTOR.
MARCUS A. HALL
BY
ATTORNEYS

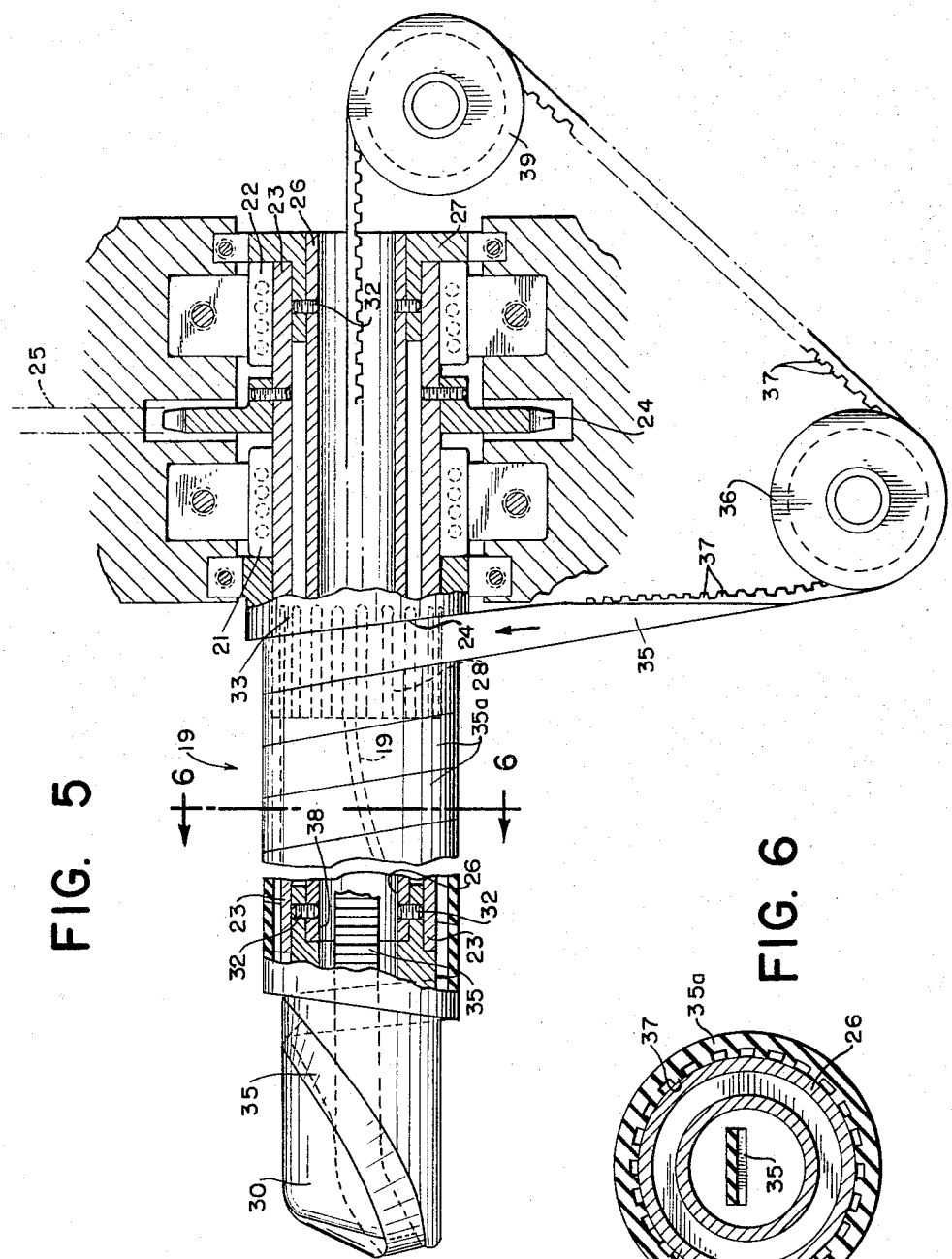

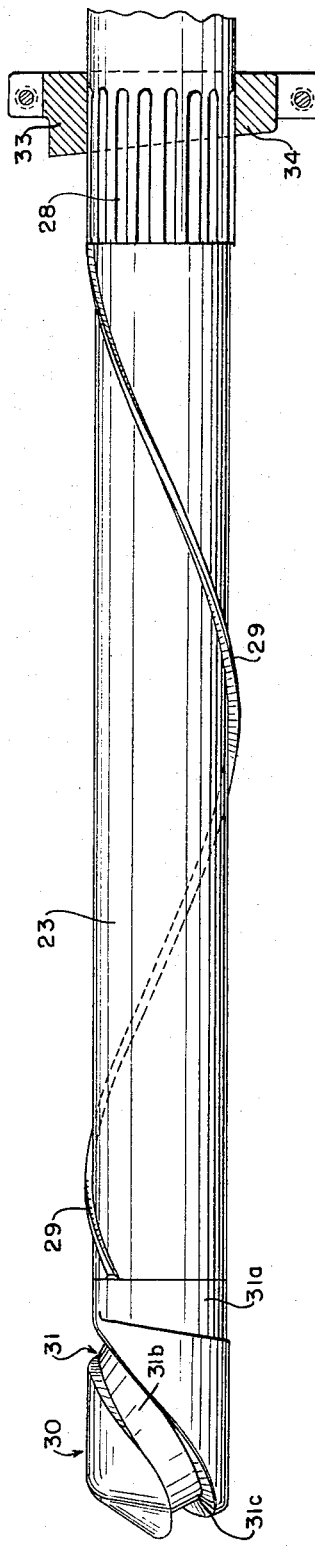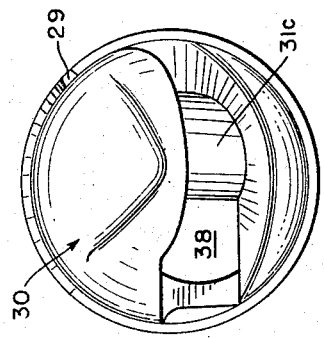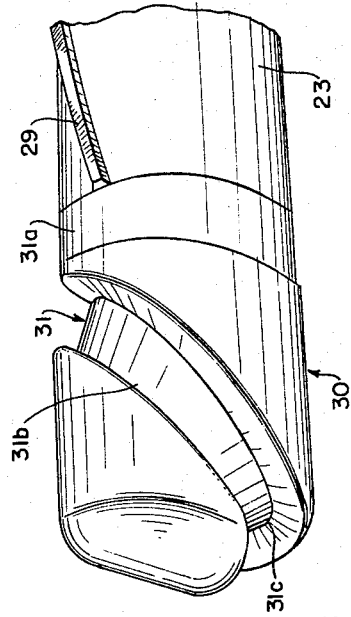
INVENTOR.
MARCUS A. HALL

United States Patent Office 3,271,064
Patented Sept. 6, 1966

3,271,064
METHOD AND APPARATUS FOR MAKING INDEFINITE LENGTH FLEXIBLE CONDUIT
Marcus A. Hall, Branford, Conn., assignor to Flexible Tubing Corporation, Guilford, Conn., a corporation of Connecticut
Filed Dec. 5, 1962, Ser. No. 242,448
4 Claims. (Cl. 264—93)

This invention relates to methods and apparatus for continuously manufacturing helically fabricated tubing of indefinite lengths. More particularly it concerns a method and apparatus for continuously forming a conduit of monolithic elastomeric material reinforced with wire, in a novel manner on a translating and rotating mandrel surface.

It is the broad purpose of this invention to provide an integrated method and apparatus for making in lengths as great as desired a flexible conduit comprised of a helically disposed reinforcing wire coated with an elastomeric and covered from one turn to the next by an unbroken pliant wall of the same elastomeric material. Flexible conduits of this type find many varied uses, not the least of which is as hose for vacuum cleaners and hair dryers and the like. There are methods and devices commercially available at the present time for making conduits of this type, but those of practical value are based upon discontinuous and intermittent manufacture wherein relatively short units of conduit of definite length are successively fabricated with an appreciable non-productive period following the completion of each unit. The present invention is predicated upon a new combination of features which departs essentially from the steps and elements of known methods and apparatus so that a conduit of the type described can be made continuously and in indefinite lengths.

In general terms, the new method of making flexible conduit of indefinite length comprises the following sequence of steps. A cylindrical mandrel surface of definite length is axially advanced and rotated without displacing that end of the surface which is forward in relation to the direction of advance. A wire is formed into a self-supporting helical configuration of successive turns closely and concentrically about this mandrel surface. A strip of elastomeric material is extruded and drawn helically about these wire turns and mandrel surface while the material is at a temperature above its setting temperature, the width and rate of advance of the strip being such that it covers the wire between the turns thereof to produce a conduit about the mandrel surface. The extruded material is then depressed closely against the wire and mandrel surface after the material is drawn thereon but before it cools to below its setting temperature. The elastomeric material of the conduit is then cooled to below its setting temperature and the conduit is directed off the forward end of the mandrel surface.

In a preferred form of the method, all of these steps are carried out continuously and in the sequence given, and periodically the conduit is cut to the desired lengths. It is also preferred that the self-supporting helical configuration of wire be spaced initially about the mandrel surface and thereafter drawn down into engagement with the mandrel surface. Also, the strip is preferably extruded at a rate slightly less than the tangential velocity of the mandrel surface so that the strip is necked down under tension as it engages the wire turns and mandrel surface, with its minimum necked-down width greater than the pitch of the wire turns. It is further preferred that the step of depressing the extruded material be carried out by continuously air-blasting the material in a localized region immediately adjacent the point where it is drawn onto the mandrel surface and wire.

The new apparatus for making a flexible conduit of indefinite length in broad terms comprises a frame and a cylinder mandrel supported at one end on the frame and free at its opposite outer end. Means are included for continuously axially rotating and advancing the surface of this mandrel toward the outer end thereof without displacing either end thereof. An array of driven helix-forming rolls are located adjacent the supporting end of the mandrel for bending a wire into a helical configuration of successive turns about the mandrel. An extruder is provided adjacent the mandrel between the outer end thereof and the helix-forming rolls from which a strip of extruded elastomeric material can be applied about the wire and mandrel to form a conduit. Fluid jet means are located adjacent the mandrel and extruder for directing a stream of fluid forcibly against the newly formed conduit before the elastomeric material sets to depress the material closely against the wire and mandrel. Means are provided between the outer end of the mandrel and the fluid jet means for cooling the elastomeric material to below its setting temperature.

This apparatus in its preferred form further includes an array of straightener rolls and an array of driven feed rolls through which the wire is directed during its approach to the helix-forming rolls. Also guide block means are preferably included for drawing the wire down into engagement with the mandrel. Beyond the outer end of the mandrel are conduit advancing means comprising two pairs of idler rolls beneath the conduit and two driving rolls above the respective pairs of idler rolls and adapted to bear down on the conduit therebetween. Each of the idler and driving rolls is skewed in the same direction with its roll axis at an angle relative to the conduit axis equal to the helix angle of the wire of the conduit, whereby the idler and driving rolls advance the conduit longitudinally away from the outer end of the mandrel. It is also preferable that means be provided for cutting the conduit to the desired lengths, such as a driven rotary blade for slicing the elastomeric material and a knife for cutting the wire.

A preferred embodiment of the invention is described hereinbelow with reference to the accompanying drawings wherein, FIG. 1 is a fragmentary plan view showing most of the steps and elements involved in the new manufacture of wire-reinforced flexible conduit;

FIG. 2 is an enlarged fragmentary section taken along the line 2—2 of FIG. 1;

FIG 3 is an enlarged fragmentary section partly broken away and taken along the line 3—3 of FIG. 1;

FIG. 4 is an enlarged fragmentary section partly broken away and taken along the line 4—4 of FIG. 1;

FIG. 5 is an enlarged elevation partly broken away and in section of the mandrel apparatus;

FIG. 6 is a section taken along the line 6—6 of FIG. 5;

FIG. 7 is an elevation of a mandrel core element with the belt removed;

FIG. 8 is an enlarged perspective of a guide device for controlling the collapse of successive belt convolutions at the forward end of the structure; and FIG. 9 is an end view of the guide device shown in FIG. 8.

All of the machine elements described herein are mounted on a common frame which for purposes of clarity is not shown in the drawings. Referring first to FIGS. 1 and 2, a driven spool 10 contains an indefinite length of coated wire 11 and it may be suitably braked to control the tension of the wire drawn therefrom. The wire is of sufficiently heavy cross section to be self-supporting but it is easily formed into bent configurations and is coated throughout its length with a thin film of elastomeric material such as vinyl plastic. The wire is drawn between two sets 12 and 13 of straightener rolls which deform it successively in perpendicular planes so that upon emerging from the second set 13 the coated wire 11 is in a straightened condition. It then passes tangentially over an idler roll 14 which guides it in the proper direction and enters between three pairs of driven feed rolls 15. Tubular guides 16 are provided in the spaces between the feed rolls 15 to direct the wire. After leaving the feed rolls 15, the wire passes between secondary driven rolls 17 and then enters an array of helix-forming rolls 18 which configure it into a helical spring-like form.

The helix-forming rolls 18 are located such that as the wire 11 proceeds therefrom it is disposed in helical shape concentrically about a mandrel 19 which is shown in FIGS. 5 through 9.

The mandrel apparatus includes a pair of aligned bearings 21 and 22. An elongated tubular mandrel core 23 is rotatably supported in these bearings and has a drive pinion 24 affixed about its outer surface between the bearings. The pinion is adapted to be driven by drive means which include a schematically illustrated drive gear 25; an electric motor, not shown, may be the primary power source in this drive means. Located concentrically within the core 23 and extending throughout its length is an inner supporting tube 26 which is affixed at one end to a stationary sleeve 27. Hence, when the pinion 24 is driven the mandrel core 23 rotates axially in the bearings 21 and 22 about the stationary supporting tube 26 and sleeve 27.

The mandrel core 23, which projects outwardly by the above-described supporting structure, is shown in detail in FIG. 7. A plurality of spine-like drive teeth 28 are formed about the core 23. On the surface of the core is the long helically disposed key 29 extending from one of the teeth 28 to the core's outermost end. The drive teeth 28 may be straight, as shown, or they may be disposed in a helical form conforming to that of the key 29. Adjacent that outermost end is a guide device 30 formed with a curvilinear groove 31 described fully hereinbelow, which is rigidly attached as shown in FIG. 5 by means of screws 32 to the end of the inner supporting tube 26. Consequently, the guide device 30 is stationary with respect to the rotating mandrel core element 23. Adjacent the butt end of the core element 23 where the teeth 28 are formed is an annular feed cam 33 having a planar working surface 34 which encircles the drive teeth and faces the opposite end of the core at an angle with respect to the core axis which is ninety degrees less than the helix angle of the key 29. The feed cam 33, which advantageously may be of filled nylon, is stationary with respect to the rotating core.

With reference to FIGS. 5 and 6, the apparatus includes a closed-loop flexible belt 35 which is directed around a pulley 36 to the mandrel core 23 at a slight angle with respect to the mandrel core axis so that it passes in edge engagement with the working surface 34 of the feed cam 33 and is wrapped about the drive teeth 28. The width of the belt is about half the maximum effective length of the teeth 28. A multiplicity of lateral gripping teeth 37 are formed on the underside of the belt 35 and are registerable with the drive teeth 28 and the helical key 29. Thus, the belt 35 is positively gripped by the rotating core 23 at the drive teeth 28 and successive convolutions 35a are wrapped about the core. The cross section of the belt may normally diverge somewhat inwardly so that it assumes a rectangular cross section when bent into the shape of the convolutions 35a.

The angle of the working surface 34 of the feed cam 33 urges each successive convolution 35a forwardly off the teeth 28 in such a manner that they adjoin one another to define a circumferentially complete mandrel surface about the core 23. There is suitable correlation between the width of the belt 35 and the helix of the key 29 so that the convolutions 35a have a helix angle ninety degrees less than the key helix angle. As a result, the key 29 engages adjoining teeth 37 on each of the convolutions 35a of the belt and thus keeps the belt from binding about the core as it slides forwardly. A suitable lubricant, of silicone base for example, may be deposited over the core 33 to reduce friction with the convolutions of the belt.

It is to be understood that the function of the key 29 is to maintain each of the belt convolutions 35a of a diameter, preferably uniform, so that they all slide easily along the surface of the core 23. Thus, the outside diameter of the core 23 is correlated with the number, size and spacing of the teeth 37 on the belt 35 so that the key 29 fits between adjoining pairs of teeth 37 at the ends of each convolution 35a with the belt length between those adjoining pairs of teeth permitting a slight looseness about the outer circumference of the core 23.

As each successive convolution reaches the outermost end of the core 23, it leaves the rotating core and key 29 and is directed onto the stationary guide device 30. As shown in FIGS. 8 and 9, the belt proceeds into an initial portion 31a of the groove 31 in the guide device, and then is carried around into a portion 31b of the groove in a helical path of increasing lead and decreasing diameter. This fairs into the outermost portion 31c of the groove which carries the belt around the nose of the guide element 31 and back into an inner bore 38 within the guide element. At that point, the plane of the belt 35 is vertically disposed as it moves rearwardly through the guide device 30 and into the bore of the inner tubular support 26. As it proceeds through the tubular support 26 it returns to a horizontal orientation and progresses rearwardly through the open back end of the support 26 to a second pulley 39. The pulley 39 maintains sufficient tension on the belt 37 to insure the controlled collapse of each successive convolution inwardly off the outer end of the core 23. After the belt leaves the pulley 39, it proceeds to the pulley 36 and repeats the cycle.

In the operation of this mandrel apparatus the pinion 24 is rotated by the drive gear 25 so that the entire mandrel core 23 turns about its axis at a constant rate. The drive teeth 28 then wrap successive convolutions 35a of the belt about the core which are displaced laterally in a forward direction by the stationary feed cam 33. These adjoining convolutions of the belt define a circumferentially complete mandrel surface which constantly advances forwardly. At the outer end of the mandrel 19 this surface is collapsed inwardly as the belt is passed around the groove 31 in the guide device 30 and is directed under tension back through the tubular support 26.

As the first turns of wire are directed about the mandrel 19 they are spaced concentrically from the mandrel surface, not because that is the nominal configuration imparted by the helix-forming rolls 18 but rather because the turns are impeded further along the mandrel and are caused to bunch up slightly at first. A few turns from their initial point of formation, the convolutions of wire rotate and translate past a pair of micro-switches 40 and 41 in sliding engagement therewith. One micro-switch, say switch 40, senses the maximum permissible diameter of the turns and if they exceed that it actuates circuitry which causes the feed rolls 15 to slow down and produce a smaller diameter helix at the helix-forming rolls 18. The other micro-switch 41 senses the minimum permissible diameter of the wire turns and if the turns are too small it actuates circuitry which speeds up the rolls 15 to increase the helix diameter.

After passing these micro-switches, the wire 11 enters between the surface of the mandrel 19 and a grooved plastic guide block 42 which forces the wire against the mandrel. This block 42 is the element which produces the bunching up effect to the right as shown in FIG. 1, and its function is mainly to push the wire 11 down against the mandrel to the helix diameter that the wire normally would assume in the rest condition. From the block 42 on to the left as seen in FIG. 1, the wire 11 remains in contact with the mandrel 19 and rotates and translates therewith. Its pitch from this point is uniform and corresponds to the pitch of the belt convolutions 35a which may be more or less than the helix pitch which the wire would assume in the rest condition.

The new apparatus also includes extruding equipment indicated generally at 43 and comprising a hopper 44 into which pellets or other forms of raw elastomeric material may be introduced. It also includes a cylinder 45 and an extruder head 46 faced off by a die plate 47 formed with a slit-type orifice designed to extrude a strip of plastic material. If vinyl plastic is the elastomeric material used, it emerges from the extruder head at about 350° F. in the form of overly-wide strip 48. The extruder head is located with respect to the mandrel 19 such that the strip 48 advances only a matter of inches and then is drawn helically about the rotating and translating mandrel surface and wire 11. The tangential velocity of the surface of the mandrel 19 is slightly greater than the linear rate of extrusion from the head 47 so that the strip 48 is necked down as shown in FIG. 1. This reduces the width and thickness of the strip 48 and pulls it tightly against the wire 11 and mandrel 19. Since the material of the strip 48 is still far above its softening temperature, which is referred to herein as the "setting" temperature, it is easily deformed in this manner. The width of the strip 48 at the point where it engages the wire 19 and mandrel 11, is at least as great as the pitch of the wire helix so that the strip forms a complete covering over the mandrel wire, and together with the coated wire constitutes a conduit.

Directly opposite the extruder head 47 are a plurality of air jets 49 which are directed toward the strip 48 just after it engages the mandrel 19 and wire 11. A blast of air from the jets 49 pressurizes a local region of the newly-formed conduit and depresses the strip 48 closely about the coated wire 11 and the mandrel 19. The temperature of the air from the jets 49 may be elevated, for example to 350° or 400° F., to maintain the newly-applied elastomeric material in a softened condition well above its setting temperature. Heated air is by no means indispensable, however, because the prime function of the jets is to apply pressure at a local region to force the cover formed by the strip 48 down closely over the turns of wire 11 and squeeze the overlying portions of successive turns of plastic strip together so that they fuse into a monolithic pliant wall. If a multi-ply tube of extensively overlapping strip is to be formed about the wire 11 and mandrel 19, three jets may be directed against the conduit wall preferably opposite successive turns of the wire. In a single-ply tube of relatively narrow strip, the strip edges may be scarfed by the extrusion die to overlap only very slightly preferably along the wire 11. In this manner, a thickened portion of the plastic covering is formed along the wire to define a reinforcing bumper. When this is done, one air jet may be directed to the ridge along the wire and at least one other jet may be directed between the wire turns. One main function of the jet directed between the wire turns is to force out air bubbles which otherwise might become entrapped between the strip and the mandrel.

After the conduit of monolithic plastic and wire is formed in this manner, it continues to rotate and translate along with the mandrel 19 to the left as shown in FIG. 1. Before it reaches the outer end 19' of the mandrel, the conduit is thoroughly wetted by a spray of coolant, such as water at about 37° F., from an overhead perforated coolant pipe 50. The run-off of coolant is collected in a pan 51 beneath the mandrel. This cooling step reduces the temperature of the plastic to below its setting point.

As the conduit proceeds off the outer end 19' of the mandrel at a rate of advance of about five to ten feet per minute, it enters first advancing means 52 which is shown in more detail in FIG. 3. It includes a pair of idler rolls 53 and 54 generally underlying the conduit and skewed as shown in FIG. 1. The axes of the idler rolls 53 and 54 define an angle with respect to the axis of the conduit equal to the helix angle of the wire 11 within the conduit. Above the idler rolls 53 and 54 is a driving roll 55 which is skewed in the same manner and which is driven through a belt 56 by a motor 57. The driving roll 55 is mounted on an arm 58 pivoted at 59 and actuated as a lever by a pneumatic cylinder 60. When the piston of the cylinder 60 is retracted it raises the driving roll 55 off the conduit, and when the piston is extended it lowers the driving roll 55 into engagement with the conduit with predetermined force designed to be firm but not crushing. Since the skew angle of the rolls 53, 54 and 55 is the same as the helix angle of the wire within the conduit, these rolls feed the conduit forwardly to the left as seen in FIG. 1 as the drive roll 55 rotates. This urges the conduit into second advancing means 61 which is virtually identical to the first in that it includes underlying idler rolls and an overlying driving roll 62 rotated through a belt by the motor 57 and capable of being lifted from the conduit by its own independently operable pneumatic cylinder 63. One of the major purposes of permitting the driving rolls 55 and 62 to lift from the conduit independently is to permit passage of waste portions of plastic which may consist of large lumps not properly extruded about the mandrel as the first foot or so of the conduit is fabricated. Also, the independently disengageable driving rolls permit control of the pressure which they exert on the conduit. It should also be noted in regard to the advancing means 52 and 61 that they do not pull the tube off the mandrel 19. The mandrel 19 is designed to feed the conduit off itself since its surface advances longitudinally. One of the functions of the advancing means 52 and 61 is to retard rotation of the tube slightly so that its wire helix tends to be tightened and to be contracted in diameter into firm driven engagement with the mandrel.

At the cutting station the conduit first encounters a rotary blade 64 which is normally retracted away from the passing conduit as shown in FIG. 4. The blade 64 is driven through a belt 65 by a motor 66 and is displaceable on a slidable frame 67 actuated by a pneumatic cylinder 68 at an angle with respect to the axis of the conduit equal to the helix angle of the wire in the conduit. Either automatically or selectively, the piston of the pneumatic cylinder 68 may be extended to slide the blade 64 forward so that it comes into cutting engagement with the plastic coating of the conduit between the turns of the wire thereof. The axial rotation of the conduit causes it to expose almost its entire circumference to the rotating blade 64, leaving the conduit almost fully severed but for a narrow web of the plastic coating and the wire 11. Backing rolls 69 may be provided on the side of the conduit opposite the blade 64 to provide a reaction surface during this slicing operation.

Very shortly after the plastic coating is sliced, the conduit passes over a block 70 beneath a heavy wire-cutting knife 71 supported on a bell crank 72 which is pivoted at 73 and actuated by a pneumatic cylinder 74. When the partially severed portion of the conduit comes beneath the knife 71, the cylinder 74 is automatically actuated so that it cuts downwardly and through the wire 11 of the conduit. As shown in FIG. 4, the knife 71 forms an angle with respect to the conduit axis which is greater than the helix angle of the wire so that the knife cuts across and through the wire during its operating stroke. Suitable receiving means 75 is located at the outlet end of the machine to collect each severed length of conduit as it is separated at the cutting station.

It is to be clearly understood that the following claims cover all variations in this preferred embodiment which come within the scope of the invention. For example, it is fully contemplated that the reinforcing wire 11 may be a metal or plastic wire coated or uncoated with an elastomeric film, or it may be any other pliable elongated element which can be bent into a resilient reinforcing helix. The term "wire" in the claims is to be construed to cover all of these variations unless otherwise qualified.

I claim:
1. In a method of making indefinite length flexible conduit on a continuously advancing and rotating mandrel surface, the improvement which comprises
   (a) forming a spaced-turn helix of wire about the mandrel surface,
   (b) freshly extruding an unset thermoplastic strip at a temperature above its setting temperature directly above the wire at an unset and a tacky stage and at a rate less than the tangential velocity of the mandrel surface so that the strip necks down to produce a covering of overlapping turns around the wire,
   (c) fluid-blasting the unset strip radially into corrugated shape over the wire turns and mandrel surface, and
   (d) removing the thermoplastic strip with the wire turns off the mandrel surface in the form of a conduit after the thermoplastic sets.

2. In apparatus for making indefinite length flexible conduit which includes means for forming a helix of wire about a continuously advancing and rotating mandrel and then covering the wire with unset thermoplastic strip helically applied over the wire and mandrel, the improvement which comprises
   (a) jet means adjacent the mandrel for directing a fluid stream forcibly against the outer surface of the unset strip to depress the material closely against the wire and mandrel,
   (b) and means for setting the strip and then removing it with the wire off the mandrel in the form of a conduit.

3. Apparatus according to claim 2 wherein the mandrel has an outer end fixed with respect to the point where the wire and strip are applied, and wherein conduit advancing means beyond the outer end of the mandrel are provided comprising:
   (a) a plurality of sets of idler rolls beneath said conduit and spaced longitudinally with respect thereto,
   (b) a plurality of driving rolls above the respective sets of idler rolls and adapted to bear down on the conduit therebetween, and
   (c) each of said idler and driving rolls being skewed in the same direction with its roll axis at an angle relative to the conduit axis equal to the helix angle of the wire of said conduit, whereby said idler and driving rolls advance said conduit longitudinally away from the outer end of the mandrel.

4. Apparatus according to claim 3 wherein means are provided for independently raising each of the driving rolls from its associated idler rolls.

References Cited by the Examiner

UNITED STATES PATENTS

| | | | |
|---|---|---|---|
| 2,539,853 | 1/1951 | Meyers et al. | 156—143 |
| 2,713,070 | 7/1955 | Meissner | 156—143 |
| 2,722,263 | 11/1955 | Beare et al. | 156—143 |
| 3,015,133 | 1/1962 | Nichols | 156—144 |
| 3,173,822 | 3/1965 | Rigant | 156—143 XR |

EARL M. BERGERT, *Primary Examiner.*

R. J. CARLSON, P. DIER, *Assistant Examiners.*